United States Patent [19]
Miyazaki et al.

[11] Patent Number: 5,878,162
[45] Date of Patent: Mar. 2, 1999

[54] IMAGE PROCESSING CIRCUIT

[75] Inventors: Tadashi Miyazaki; Hidechika Kumamoto, both of Osaka, Japan

[73] Assignee: Mita Industrial Co., Ltd., Osaka, Japan

[21] Appl. No.: 345,819

[22] Filed: Nov. 21, 1994

[30] Foreign Application Priority Data

Nov. 30, 1993 [JP] Japan .................................. 5-299651
Dec. 1, 1993 [JP] Japan .................................. 5-301556

[51] Int. Cl.⁶ ...................................................... G06K 9/00
[52] U.S. Cl. ........................ 382/162; 382/167; 358/518
[58] Field of Search ................................... 382/100, 162, 382/167; 358/296, 518, 462; 372/9, 32; 399/9, 46; 430/363

[56] References Cited

U.S. PATENT DOCUMENTS

| | | | |
|---|---|---|---|
| 5,457,007 | 10/1995 | Asami | 430/363 |
| 5,457,540 | 10/1995 | Kajita | 358/296 |
| 5,539,539 | 7/1996 | Fujimoto et al. | 358/518 |

FOREIGN PATENT DOCUMENTS

| | | | |
|---|---|---|---|
| 0 506 332 A3 | 9/1992 | European Pat. Off. | G06K 15/00 |
| 0 535 891 A3 | 4/1993 | European Pat. Off. | H04N 1/387 |
| 28 05 146 | 8/1978 | Germany | B41F 1/12 |

*Primary Examiner*—Jose L. Couso
*Assistant Examiner*—Anh Hong Do
*Attorney, Agent, or Firm*—Beveridge, DeGrandi, Weilacher & Young, LLP

[57] ABSTRACT

An image processing circuit which adds, by means of a yellow color image data, forgery tracing information to yellow, magenta and cyan color image data obtained by reading out of an original. A tracing information adder replaces the read-out yellow color image data with a yellow color image of a higher density in a low-density area where the density of the read-out yellow color image data is equal to or below a set threshold value. In a high-density area where the density of the read-out yellow color image data exceeds the set threshold value, the tracing information is added by adding a predetermined value to the read-out yellow color image data.

21 Claims, 8 Drawing Sheets

|   | 0 | 1 | 2 | · · · | n |
|---|---|---|---|---|---|
| 0 | 0 | 1 | 0 | · · · | 1 |
| 1 | 1 | 0 | 0 | · · · | 0 |
| 2 | 0 | 0 | 0 | · · · | 0 |
| · · · | · · · | · · · | · · · | · · · | · · · |
| m | 0 | 0 | 1 | · · · | 0 |

Fig. 4

|   | 0 | 1 | 2 | · · · | n |
|---|---|---|---|---|---|
| 0 | 1 | 1 | 1 | · · · | 1 |
| 1 | 1 | 0 | 0 | · · · | 0 |
| 2 | 1 | 1 | 0 | · · · | 0 |
| · · · | · · · | · · · | · · · | · · · | · · · |
| m | 1 | 0 | 1 | · · · | 1 |

IMAGE PROCESSING CIRCUIT

BACKGROUND OF THE INVENTION

1. Field of the Invention

The present invention relates to an image processing circuit for use in a digital full-color electrographic copying machine having a forgery preventing function.

2. Description of the Prior Art

In recent years, digital color electrographic copying machines have been spreading, and most of them are used for beneficial purposes. However, since anyone can easily obtain a copy with a high resolution and an excellent color reproducibility because of the improvement in performance of such copying machines, the forgery of bank notes, which is a serious crime, may easily be committed.

For this reason, manufactures of copying machines of this type enables tracing with respect to a copy (i.e. the tracing of the copying machine with which the original is copied and of the date of the copying) in order to prevent to the utmost the forgery of bank notes which is a crime exerting a great influence on society. Specifically, when an original is copied, tracing information such as the machine number of the copying machine and the date of the copying are added to the copy of the original. In order that the image other than the added information is not damaged due to the addition of such tracing information, it is necessary to add the information at a density where the information cannot visually be recognized. For this reason, a tracing information adding method is employed using a yellow color image data which is difficult to visually recognize.

In such a tracing information adding method, when tracing information is added by adding a yellow color image data of a predetermined density (this density should be as low as possible so that visual recognition is impossible), for example at a low density portion (white portion) where there is hardly any yellow color image data, the density of the added tracing information is too low, so that it may be impossible to read out the information from forged bank notes by a color scanner. Therefore, a way to solve this problem is desired.

In the above-described method of adding tracing information, in order to further decrease the influence on the reproduced image by the addition of the tracing information, it is desired that the tracing information is added uniformly to the entire image. In this case, the ratio of the area of the added tracing information to the area of the reproduced image is necessarily fixed. That is, the ratio of the area of the tracing information to the area of the reproduced image is necessarily fixed even if the contents of the tracing information are changed, for example, even if the copy date is changed every day.

Further, it is desirable that the tracing information added in this manner should be easily and surely detected by anyone that has no special skills so that the tracing of the copy may be made rapidly at the sites where criminal cases occur.

SUMMARY OF THE INVENTION

An object of the present invention is to provide an image processing circuit which adds tracing information in a manner such that the deterioration in output image due to the addition of the information is minimized and that the added information is read out by a color scanner without a failure.

Another object of the present invention is to provide an image processing circuit where the added tracing information is easily sensed.

An image processing circuit of the present invention is provided with an information adding means for adding forgery tracing information data to a color image data and a means for increasing the density of the added information data in a low-density area where the density of the color image data is equal to or below a predetermined value. The information adding means adds the tracing information in a form of an m×n matrix by adding a yellow color image data and specifies the contents of the tracing information based on a position within the m×n matrix where the yellow color image data is added.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Referring to the drawings, an image processing circuit used in a digital full-color electrographic copying machine will hereinafter be described as an embodiment of the present invention. In this embodiment, the density of the yellow color image data added as the tracing information is higher in a yellow low density portion of the original than in a yellow high density portion thereof.

Figure 2:
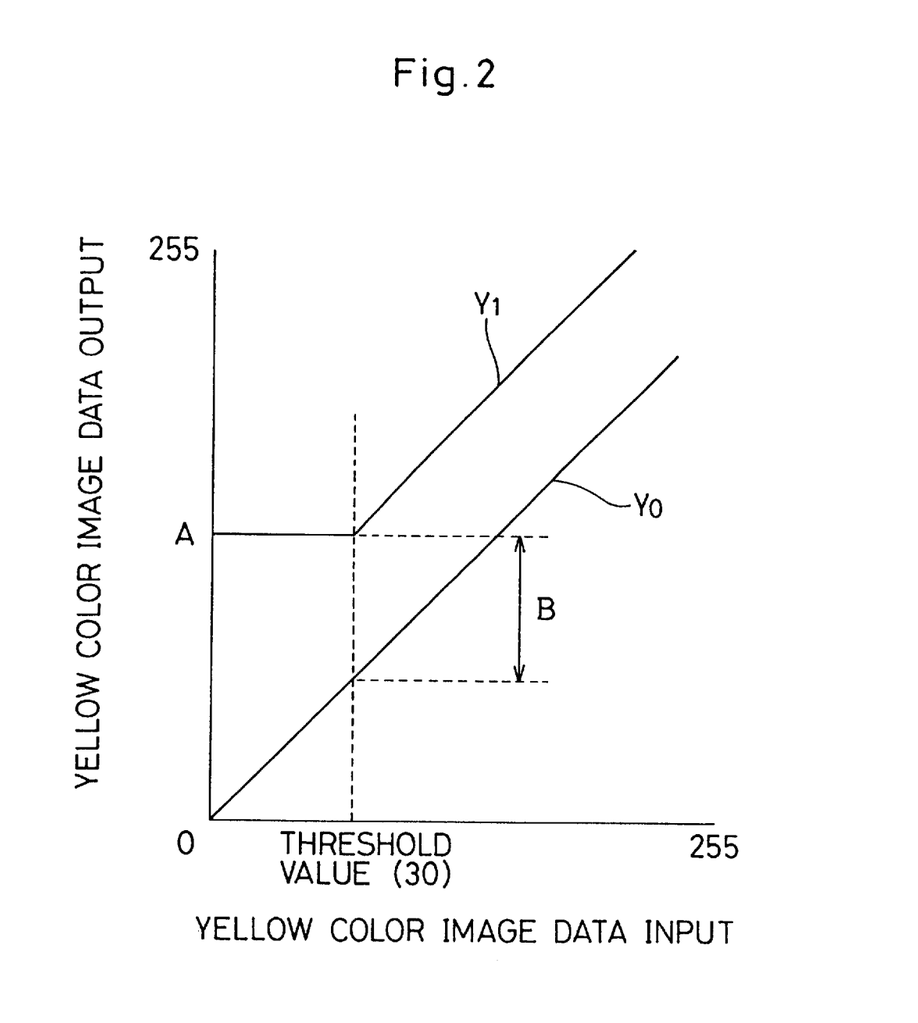
FIG. 2 is a view of assistance for explaining the addition of density by an adding circuit of the circuit of FIG. 1.

Specifically, as shown in FIG. 2, in the yellow high density portion of the original where the density of the yellow image data read-out from the original exceeds a set threshold value, the tracing information is added by adding a predetermined value (in this case, a value B which is as small as possible so that visual recognition is impossible) to the density of the read-out yellow image data. On the contrary, in the yellow low density portion of the original where the density of the yellow image data read-out from the original is equal to or lower than the set threshold value, the tracing information is added by replacing the read-out yellow color image data with a yellow color image data of a predetermined value (in this case, a value A which is higher than the value B so that it can be read out by a scanner).

By this method, the tracing information added to any density portion of the copy can be read-out by a color scanner without a failure with a minimum deterioration in copy image quality due to the addition of the tracing information. $Y_0$ of FIG. 2 shows a relationship between yellow color image data input and output when an 8-bit yellow color image data (256 tones) read-out from an original is outputted without the addition of the density as the tracing information, and $Y_1$ shows a relationship between the output and input when the density is added as the tracing information. The threshold value is 30 tones.

Moreover, in this embodiment, tracing information is added in a manner such that the ratio of the area of the tracing information to the area of the reproduced image is fixed irrespective of the contents of the tracing information and that, together with the tracing information, position information is added for indicating the position on the reproduced image where the tracing information is added.

Figure 3:
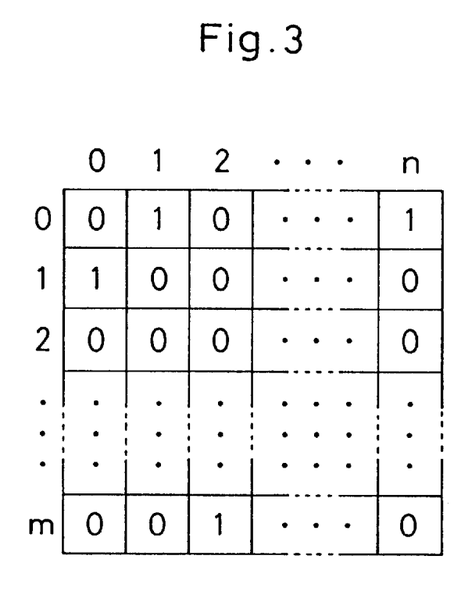
FIG. 3 shows an example where the addition of the information is performed in a matrix in the circuit of FIG. 1.

For this purpose, the tracing information by means of yellow image data is added in the form of m×n matrix as shown in FIG. 3, and the contents of the tracing information are changed based on the position within the matrix where the yellow color image data is added. In the figure, "0" represents positions where the yellow image data is not added, and "1" represents positions where the yellow image data is added. The yellow image data is added to only one cell in each row. For example, when only a machine number of n figures is added as the tracing information, the first row is the highest figure and the nth row is the lowest figure.

Figure 4:
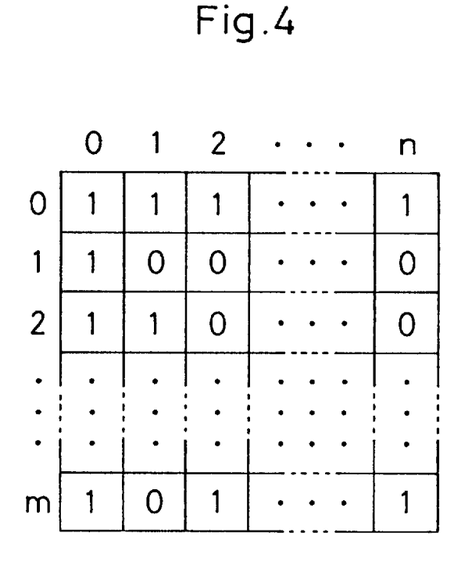
FIG. 4 shows another example where the addition of the information is performed in a matrix in the circuit of FIG. 1.

In FIG. 4, the addition of the position information by means of yellow color image data is made while all the cells in the 0th row and 0th column located along the periphery of the m×n matrix is "1". In this case, tracing information having m−1 columns from 1 to m and n−1 rows from 1 to n is formed and added. Thus, by adding position information to a column or a row along the periphery of the matrix or to both of the row and the column, the position of the tracing information on the reproduced image is easily detected at the time of tracing.

Figure 1:
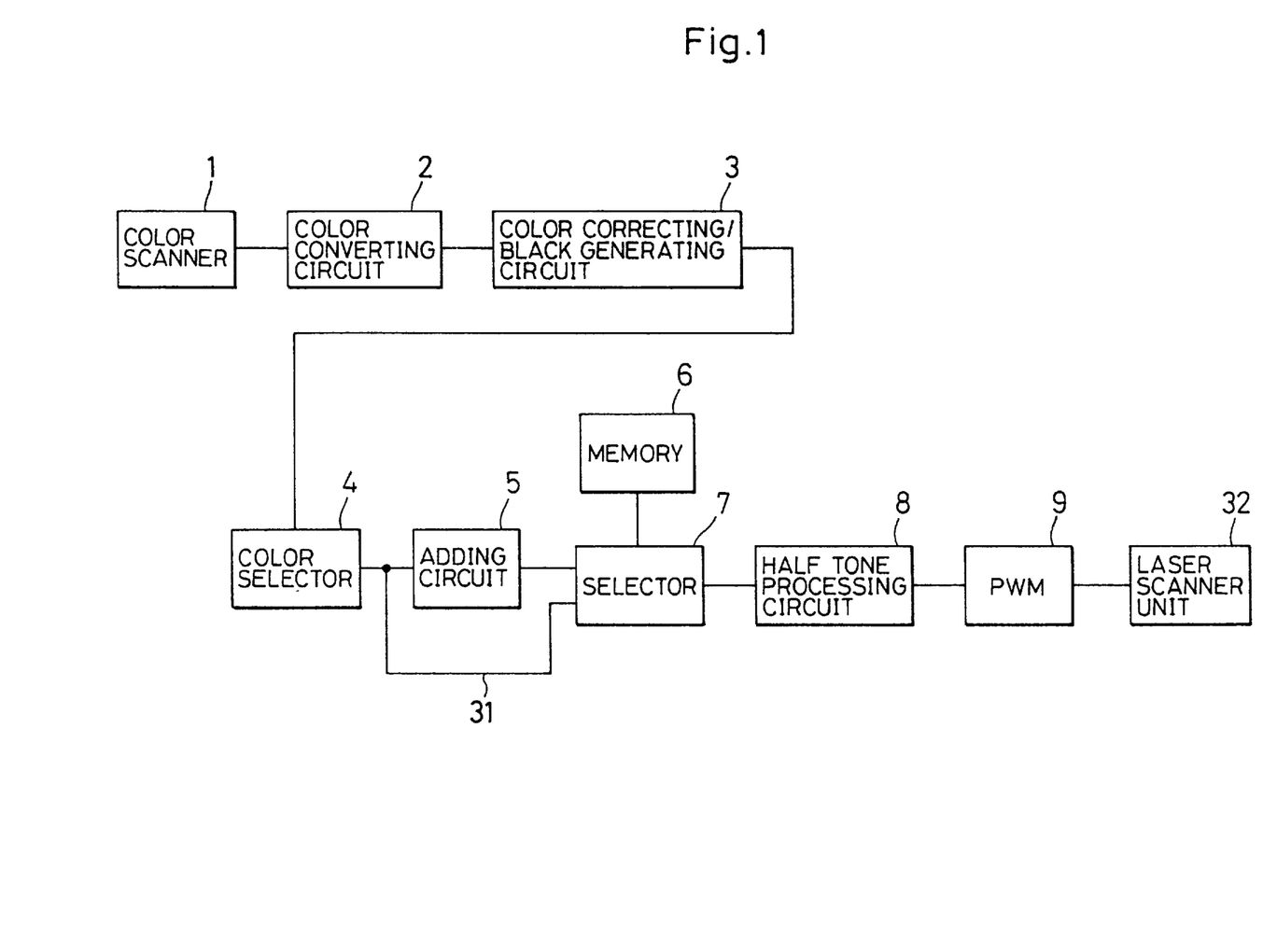
FIG. 1 is a block circuit diagram showing an image processing circuit embodying the present invention.

Referring to FIG. 1, there is shown an image processing circuit employing the above-described adding method. Reference numeral 1 is a color scanner which outputs color image data in the form of the three primary colors of light (red (R), green (G) and blue (B)) by reading-out color image data of a color original to be copied. Reference numeral 2 is a color converting circuit which converts color image data in the form of the three primary colors of light outputted from the color scanner 1 into color image data of three colors of yellow, magenta and cyan representative of toner density.

Reference numeral 3 is a color correcting/black generating circuit which color-corrects (for example, corrects the colors to fit the characteristics of the human eye) the 8-bit yellow, magenta and cyan color image data (256 tones) outputted from the color converting circuit 2 and that generates black color image data. Reference numeral 4 is a color selector which successively outputs the data of the four color components of yellow, magenta, cyan and black from the color correcting/black generating circuit 3 obtained by reading out a color original. In the copying machine of FIG. 11, since an image of each color is superposed one on another to form a color image on a sheet, colors are selected one by one by the color selector 4.

Reference numeral 5 is an adding circuit which adds a density (tone) as the tracing information as shown in FIG. 2 when a yellow component of the color image data of yellow is supplied from the color selector 4. In this case, in the yellow low density portion where the value of the yellow color image data is equal to or lower than 30 tones, the read-out yellow color image data is replaced by a yellow color image data of A tones which can be read out by a color scanner, and in the high yellow density portion where the value of the yellow color image data read out from the original exceeds 30 tones, B tones which is as low as possible so that the image quality does not deteriorate is added to the value of the yellow color image data from the color selector 4.

Figures 5, 5A:
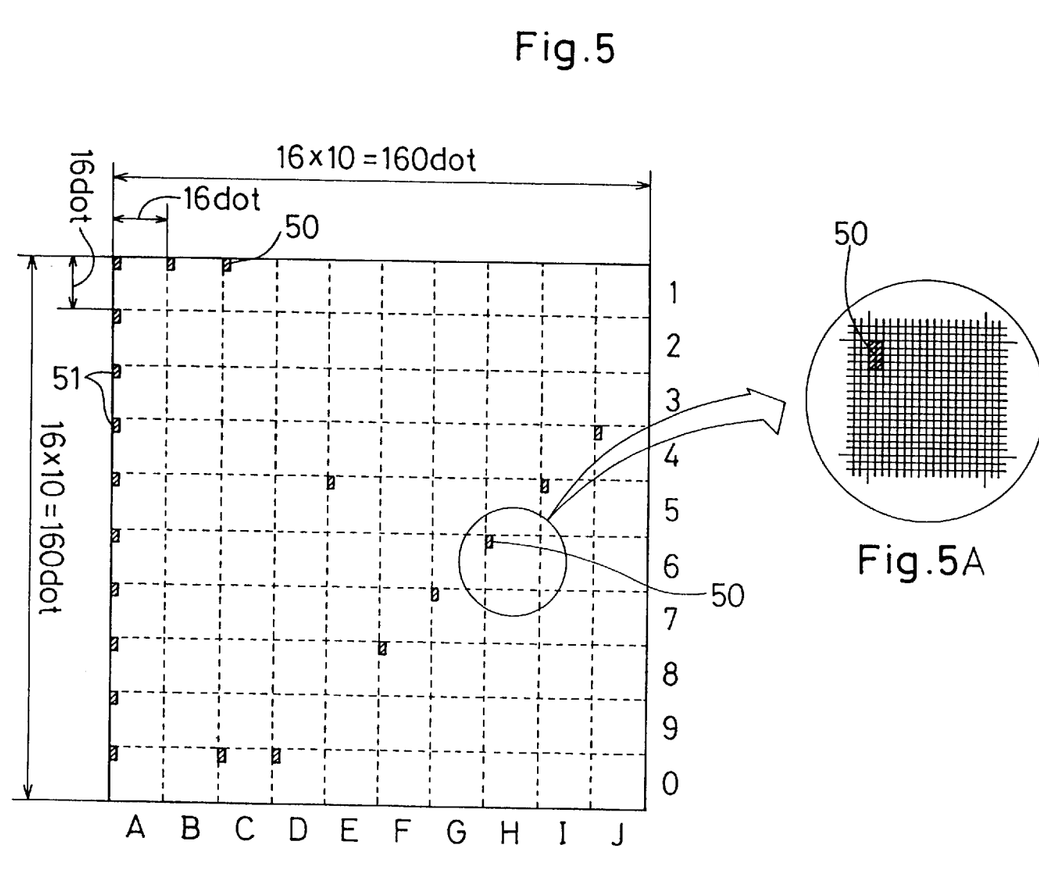
FIG. 5 a detail view of information when the addition of information is performed in a matrix in the circuit of FIG. 1.

Reference numeral 6 is a memory for storing a position data for specifying the position of density addition in order to add the density as the tracing and position information in the form of the matrix as shown in FIG. 4. To the yellow component of the color image data selected by the color selector 4, a density processing as shown in FIG. 2 is performed by the adding circuit 5 irrespective of the position to which the tracing information is added. In the memory 6, a position data is stored on a position to which the tracing information is added for a color image data as shown in FIG. 3, FIG. 4 or FIG. 5. To a selector 7, the yellow component data density-processed by the adding circuit 5 and a yellow component data (not density-processed) which bypasses the adding circuit 5 through a bypass 31 are inputted. Either of the output data of the adding circuit 5 and the data of the bypass 31 is selected depending on the data supplied from the memory 6, and the selected data is outputted. The output data of the adding circuit 5 is selected by the position data from the memory 6. While the magenta, cyan and black component data are being outputted from the color selector 4, the selector 7 outputs the data of the bypass 31.

FIG. 5 shows a 10×10-block (160×160-dot) matrix consisting of a 16×16 unit information block where tracing information 50 and position information 51 whose unit information sizes in the main and sub scanning direction are respectively two dots and four dots are added based on the position data from the memory 6 so that the minimum information addition pitches in the main and sub scanning directions are respectively (16-2) dots and (16-4) dots. From the selector 7, yellow color image data as shown in FIGS. 6 and 7 are outputted at the positions of all the tracing and position information 50 and 51.

In actuality, the tracing information and the position information are repeatedly added at a predetermined pitch both in the main and sub scanning directions so that every 160×160-dot matrix, a portion where no information is added is left along the periphery of the matrix. For example, when the input image is a bill, the tracing information and the position information are added to the entire surface of the output image in a matrix unit 90 of approximately 1cm× 1cm. The matrix unit 90 corresponds to the entire of the matrix of FIG. 5.

Figure 6:
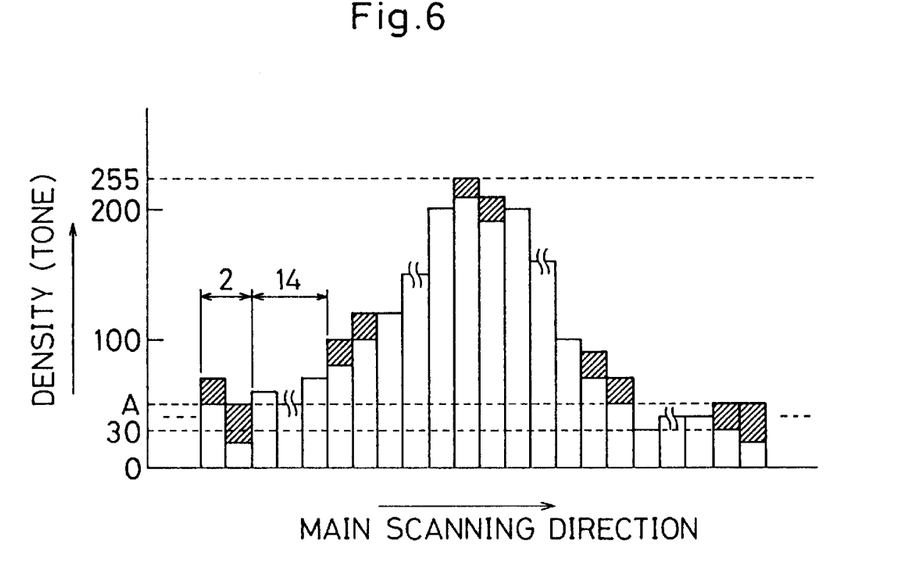
FIG. 6 shows an example of a yellow color image data output from a selector in the main scanning direction in the circuit of FIG. 1.
Figure 7:
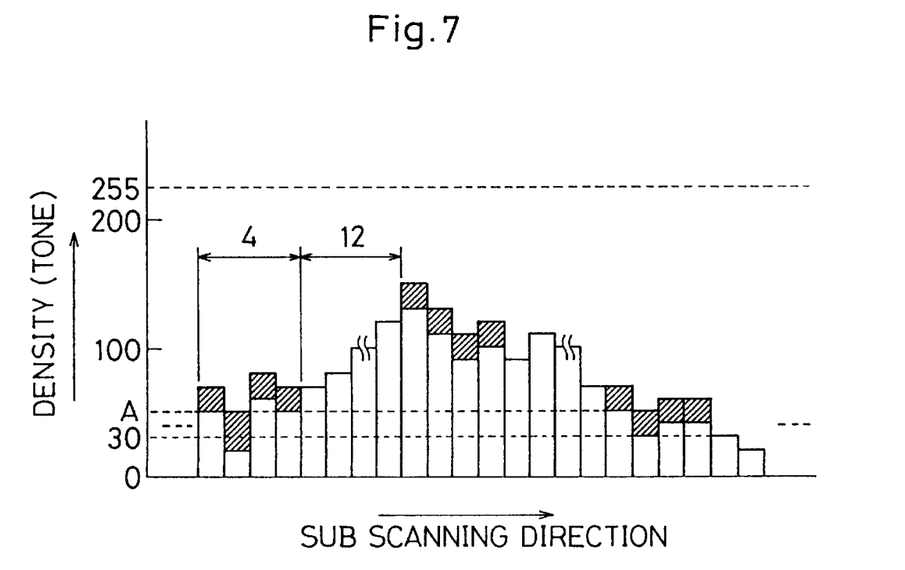
FIG. 7 shows an example of a yellow color image data output from the selector in the sub scanning direction in the circuit of FIG. 1.
Figure 8:
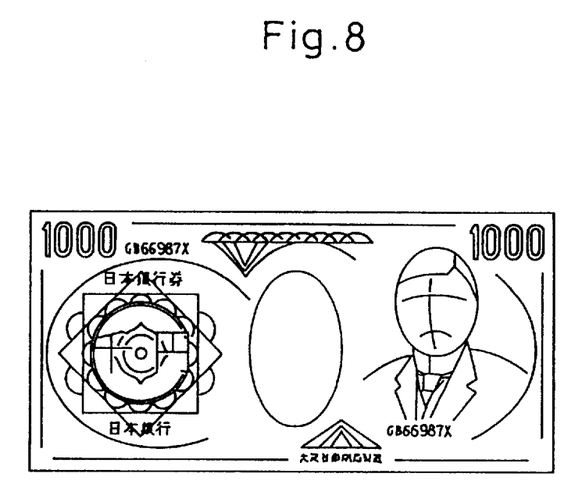
FIG. 8 shows an input image which is a bank note.
Figure 9:
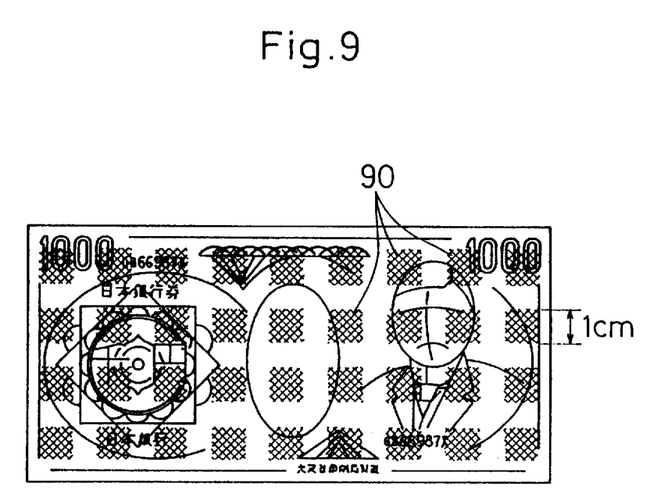
FIG. 9 shows an output image of the input image of FIG. 8.

In FIGS. 6 and 7, the hatched portions represent the added density. In FIG. 5, the hatched portions represent the position of density addition at the unit information size (2×4 dots) within the matrix. To the column A of the matrix, position information is added which is used as a reference position in the main scanning direction for detecting tracing information. To the column B of the matrix, copy year information is added where B·1=1993, B·2=1994, . . . , B·0=2002. To the column C of the matrix, copy month information is added where C·1=January, C·2= February, . . . , C·0=October, C·1 and C·0=November, C·2 and C·0=December. To the columns D and E, copy day information is added where D·1 to D·0=the tenth digit of the day and E·1 to E·0=the unit digit of the day. To the columns F to J, machine number information is added represented by a decimal number of five digits where the highest digit is in the column F and the lowest digit is in the column J. In this figure, tracing information is added which shows that copying is made on Nov. 5, 1993 with a copying machine of a machine number of 87654. The date of copying is automatically renewed by changing the position data from the memory 6 by a clock function.

In FIG. 1, reference numeral 8 is a half tone processing circuit which executes a tone processing for reproduction of half tone according to a multi-value dither method. Reference numeral 9 is a pulse width modulating circuit which converts one pixel into many values by varying a pulse width for controlling ON/OFF of a laser beam output according to an output from the half tone processing circuit 8. The pulse width modulation signal is supplied to a succeeding laser scanner unit 32.

Figure 11:
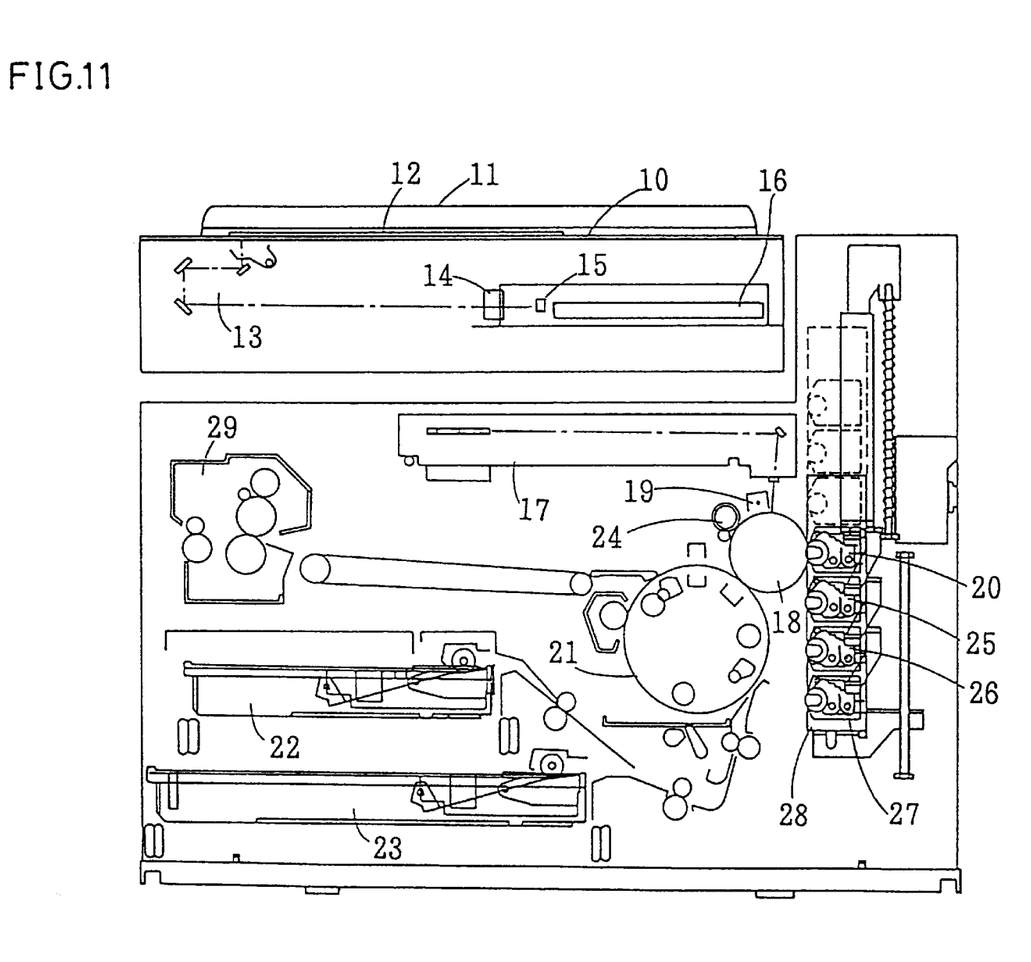
FIG. 11 schematically shows a digital full color electrographic copying machine on which the present invention is mounted.

FIG. 11 schematically shows a digital full-color electrographic copying machine provided with an image processing circuit for adding tracing information in the above-described manner. A color original 12 placed on a contact glass 10 while being pressed thereonto by an original cover 11 is scanned by a scanning optical system 13 constituting a color scanner portion. Image information of the original 12 is directed via a condenser lens 14 to a light receiving device 15 such as a charge coupled device (CCD), where the image information is converted into an electric signal. Then, at an image processing circuit portion 16, the addition of tracing information and a signal processing such as color conversion necessary for image processing are performed with respect to the electric signal, and thereafter, a latent image is formed on a photoreceptor drum 18 by a laser scanner unit 17. Prior to this operation, the surface of the photoreceptor drum 18 is charged by a main charger 19.

To form a color image, a latent image is formed on the photoreceptor drum 18 by a laser beam output based on a pulse width modulation (PWM) signal of a yellow color image data with respect to which the addition of tracing information and the signal processing such as color conversion necessary for image processing have been performed. The latent image is developed by a Y developer unit 20. The Y developer unit 20 contains yellow toner and develops the latent image on the photoreceptor drum 18 with the yellow toner. The image on the photoreceptor drum 18 developed with the yellow toner is transferred onto a sheet of paper arranged to wind around the surface of a transfer drum 21. The sheet of paper is supplied from a paper feeding cassette 22 or 23 through a paper feeding path.

The sheet remains on the surface of the transfer drum 21, and an image of another color is transferred thereonto. Specifically, residual toner and charge on the photoreceptor drum 18 are removed by a cleaning portion 24 and a discharging portion (not shown), respectively, and thereafter, the photoreceptor drum 18 is charged again by the main charger 19. Then, a latent image corresponding to a magenta image formed on the photoreceptor drum 18 by a laser beam output for forming a latent image based on a PWM signal of a magenta color image data with respect to which the signal processing such as color conversion necessary for image processing has been performed is developed by an M developer unit 25. At this time, the M developer unit 25 is brought to a position opposite to the photoreceptor drum 18 in place of the Y developer unit 20, and develops the latent image with magenta toner.

In this embodiment, the Y developer unit 20 for the development of yellow, the M developer unit 25 for the development of magenta, a C developer unit 26 for the development of cyan and a BK developer unit 27 for the development of black are successively attached as shown in FIG. 11 in a vertical direction on a moving member 28 which moves upward and downward. The developer units are alternatively brought to a development position (the position opposite to the photoreceptor drum 18) according to the color of the color image data for forming the latent image by the laser beam output.

The image on the photoreceptor drum 18 developed with the magenta toner is transferred onto the sheet (the sheet where the yellow image has been transferred) on the surface of the transfer drum 21. Cyan and black images are transferred onto the sheet in a similar manner, so that a color image is formed. The sheet where the color image has been formed is separated from the transfer drum 21, and the image is fixed at a fixing portion 29. Then, the sheet is discharged from the electrographic copying machine.

Figure 10:
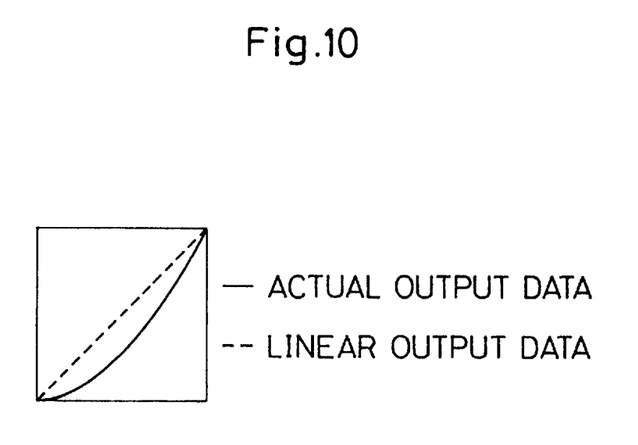
FIG. 10 shows a characteristic example of a half tone processing circuit.

As described above, according to the present invention, in an image processing circuit which adds tracing information by means of yellow color image data, the tracing information can be read out by a scanner without a failure with a minimum influence on the image quality by the addition of the tracing information irrespective of the density area of the copy to which the information is added. As a result, the tracing performance is remarkably improved while the image quality does not greatly deteriorate. In many copying machines, to obtain a more beautiful reproduced image, the image data of a low tone portion is corrected to be low as shown in FIG. 10 by the half tone processing circuit 8 of FIG. 1. In the copying machines performing such a half tone processing, the low tone portion is printed so that its density is lower than the density where the tracing information is actually added. Consequently, it is difficult to detect the tracing information. In the present invention, however, since information of a rather high density is added to the low tone portion, the detection is sufficiently performed. Even in copying machines which do not perform the processing as shown in FIG. 10, it is difficult to obtain a sufficient density in a very low tone portion of a reproduced image. Therefore, by performing the processing as shown in FIG. 2 like in the present invention, the detection of the tracing information is ensured. While a case where the threshold value is set to 30 tones is described in this embodiment, the present invention is not limited thereto. A fine adjustment of the threshold value may be made by a manufacturer according to the condition of the copying machine.

Moreover, according to the present invention, in an image processing circuit which reproduces an image by adding tracing information, the tracing information is added in a manner such that the ratio of the area of the tracing information to the area of the reproduced image is fixed irrespective of the contents of the information, and position information is added for detecting the position on the reproduced image where the tracing information is added. As a result, the influence on the image quality by the addition of the tracing information is maintained uniform, and the tracing performance is largely improved.

Obviously, many modifications and variations of the present invention are possible in light of the above teachings. It is therefore to be understood that within the scope of the appended claims, the invention may be practiced other than as specifically described.

What is claimed is:

1. An image processing circuit which provides additional density information representing an information image to color image data including yellow, magenta and cyan components, the circuit comprising:

density determining means for determining a density value of predetermined portions of a yellow component of the color image data, and density information providing means for providing density information to predetermined portions of the yellow component of the color image data, such that the density information provided to a predetermined portion of the yellow component has a high value when a density value of the predetermined portion is low and the density information provided to a predetermined portion of the yellow component has a low value when a density value of the predetermined portion is high.

2. An image processing circuit according to claim 1, wherein said density information providing means provides the density information to predetermined portions of the yellow component of the color image data by replacing the density value of a predetermined portion of the yellow component with a first predetermined density value when the density value of the predetermined portion is equal to or lower than a set threshold value, and adding a second predetermined density value to the density value of a predetermined portion when the density value of the predetermined portion exceeds the set threshold value, the first predetermined density value being larger than the second predetermined density value.

3. An image processing circuit according to claim 1 wherein said density information providing circuit provides density information to the color image data such that a ratio of an area of the information image to an area of an image represented by the color image data is fixed irrespective of an information content of the information image.

4. An image processing circuit according to claim 3, wherein said information image is arranged according to an m×n matrix, and an information content of the information image is based on a position of components of the information image within the m×n matrix.

5. An image processing apparatus according to claim 1, wherein the information content of the information image includes tracing information for tracing an origin of an image produced from the color image data having density information provided thereto.

6. An image processing circuit according to claim 5, wherein an information content of the information image includes position information for detecting a position of the tracing information within the information image.

7. An image processing circuit according to claim 6, wherein the tracing information is arranged in an m×n matrix and the position information is located in a row or column of the matrix to indicate the position of the tracing information within the matrix.

8. An image processing apparatus, comprising:

a density information providing circuit for providing density information representing an information image to color image data by providing density information to predetermined portions of at least one color component of the color image data, such that the density information provided to a predetermined portion of the at least one color component has a high value when a density value of the predetermined portion is low, and the density information provided to a predetermined portion of the at least one color component has a low value when a density value of the predetermined portion is high; and an image forming apparatus for forming a color image according to color image data to which the density information had been provided.

9. An image processing apparatus according to claim 8, wherein the density information providing circuit provides the density information to the predetermined portions of the at least one component of the color image data by replacing a density value of a predetermined portion of the at least one color component with a first predetermined density value when the density value of the predetermined portion is equal to or lower than a set threshold value, and adding a second predetermined density value to the density value of a predetermined portion of the at least one color component when the density value of the predetermined portion of the at least one color component exceeds the set threshold value, the first predetermined density value being larger than the second predetermined density value.

10. An image processing apparatus according to claim 8, wherein the at least one color component is a yellow color component.

11. An image processing apparatus according to claim 8, wherein an information content of the information image includes tracing information for tracing an origin of an image produced from the color image data having density information provided thereto.

12. An image processing apparatus according to claim 11, wherein the tracing information includes an apparatus number for identifying the image forming apparatus and an image formation date.

13. An image processing apparatus according to claim 11, wherein the information content of the information image further includes position information for identifying a position of the tracing information within the information image.

14. An image processing apparatus according to claim 8, wherein the information image is arranged according to a matrix, and an information content of the information image corresponds to a position of components of the information image within the matrix.

15. An image processing apparatus according to claim 14, wherein the matrix is divided into a plurality of submatrices, such that each component of the information image is located at a portion of a submatrix; and the matrix includes a position row, such that a location of each component of the information image in a submatrix of the position row indicates the portion of the submatrix where each component of information within a corresponding column is positioned, or a position column, such that a location of each component of the information image in a submatrix of the position column indicates the portion of the submatrix where each component of information within a corresponding row is positioned.

16. An image processing apparatus according to claim 14, wherein the information content of the information image includes tracing information for tracing an origin of an image produced from the color image data having density information provided thereto.

17. An image processing apparatus according to claim 16, wherein the tracing information includes an apparatus number for identifying the image forming apparatus and an image formation date.

18. An image processing apparatus according to claim 8, wherein the density information providing circuit provides density information representative of an information image such that a ratio of an area of an information image to an area of an image reproduced according to the color image data is fixed irrespective of an information content of an information image.

19. An image processing apparatus according to claim 8, further including scanning means for scanning an original color image and producing color image data representative of the scanned original color image.

20. An image processing apparatus according to claim 19, wherein the scanning means includes:

a scanner for scanning a color original image and producing first color image data corresponding to colors of the scanned original image;

a color converting circuit which converts the first color image data from the scanner into second color image data having magenta, cyan, and yellow components;

a color component selector which alternatively selects and successively outputs the magenta, cyan and yellow components produced by the color converting circuit.

21. An image processing apparatus according to claim 20, further including a bypass for transmitting the second color image data from the scanning means to the image forming apparatus, so as to bypass the information providing circuit; and a bypass selector which selectively operates the bypass based on the color component selected by the selector, and, for each portion of the at least one color component, a position in the original color image to which the portion of the at least one color component corresponds.

* * * * *